United States Patent
Ton-That et al.

(10) Patent No.: US 7,691,944 B2
(45) Date of Patent: Apr. 6, 2010

(54) PRIMER COMPOSITION AND USES THEREOF

(75) Inventors: Minh-Tan Ton-That, Montreal (CA); Johanne Denault, Longueuil (CA); Kenneth C. Cole, Saint-Hubert (CA); Margaret Cole, legal representative, Saint-Hubert (CA)

(73) Assignee: National Research Council of Canada, Ottawa, Ontario (CA)

( * ) Notice: Subject to any disclaimer, the term of this patent is extended or adjusted under 35 U.S.C. 154(b) by 0 days.

(21) Appl. No.: 12/461,441

(22) Filed: Aug. 12, 2009

(65) Prior Publication Data

US 2010/0044914 A1    Feb. 25, 2010

Related U.S. Application Data (62) Division of application No. 11/133,252, filed on May 20, 2005, now Pat. No. 7,579,405.

(60) Provisional application No. 60/572,758, filed on May 21, 2004.

(51) Int. Cl.
  *B29C 65/00*   (2006.01)
  *C08L 63/00*   (2006.01)

(52) U.S. Cl. .................. 525/65; 156/304.6; 525/112; 525/114; 525/119

(58) Field of Classification Search ............ 525/65, 525/112, 114, 119; 156/304.6
See application file for complete search history.

(56) References Cited

U.S. PATENT DOCUMENTS 4,444,923 A    4/1984   McCarty
6,194,514 B1   2/2001   Scheuermann et al.
6,337,134 B1   1/2002   Takai
6,344,500 B1   2/2002   Ogawa et al.
6,391,461 B1   5/2002   Ryntz et al.
6,494,983 B1  12/2002   Graue et al.
6,497,337 B1  12/2002   Kehe
2005/0191490 A1  9/2005  Ton-That et al.

FOREIGN PATENT DOCUMENTS

JP        06299089        10/1994
JP        06299089 A    * 10/1994
WO     WO 2004-085558    10/2004
WO     WO 2004085558 A1 * 10/2004

OTHER PUBLICATIONS

English translation of JP 06299089 A.*
Abstract of JP 62256872 published Nov. 9, 1987, Mitsubishi Kasei Vinyl.

(Continued)

*Primary Examiner*—Randy Gulakowski
*Assistant Examiner*—Alicia M Toscano
(74) *Attorney, Agent, or Firm*—Hans Koenig (57) ABSTRACT

The present invention provides a primer for a thermoplastic and/or elastomeric substrate, the primer comprising a film of an epoxy-modified polymer selected from the group consisting of an epoxy-modified-thermoplastic polymer, an epoxy-modified-thermoplastic polymeric composite, an epoxy-modified-elastomeric polymer, an epoxy-modified-elastomeric polymeric composite, a blend thereof, and any mixture thereof. Also provided are methods of repairing, inserting, assembling and coating a thermoplastic or elastomeric substrate using the primer of the present invention.

10 Claims, 1 Drawing Sheet

OTHER PUBLICATIONS

Abstract of JP 7003060 published Jan. 6, 1995, Sankei Giken Kogyo KK.

Abstract of JP 4033974 published Feb. 5, 1992, Sunstar Engineering Inc.

Office Action dated Oct. 31, 2006 on U.S. Appl. No. 11/133,252, filed May 20, 2005.

Office Action dated May 2, 2007 on U.S. Appl. No. 11/133,252, filed May 20, 2005.

Office Action dated Aug. 9, 2007 on U.S. Appl. No. 11/133,252, filed May 20, 2005.

Office Action dated Oct. 31, 2007 on U.S. Appl. No. 11/133,252, filed May 20, 2005.

Office Action dated Mar. 26, 2008 on U.S. Appl. No. 11/133,252, filed May 20, 2005.

Office Action dated Jul. 18, 2008 on U.S. Appl. No. 11/133,252, filed May 20, 2005.

Office Action dated Dec. 19, 2008 on U.S. Appl. No. 11/133,252, filed May 20, 2005.

Office Action dated Mar. 24, 2009 on U.S. Appl. No. 11/133,252, filed May 20, 2005.

Notice of Allowance dated May 8, 2009 on U.S. Appl. No. 11/133,252, filed May 20, 2005.

* cited by examiner

PRIMER COMPOSITION AND USES THEREOF

CROSS-REFERENCE TO RELATED APPLICATIONS

This application is a division of U.S. patent application Ser. No. 11/133,252 filed May 20, 2005, now issued under U.S. Pat. No. 7,579,405 on Aug. 25, 2009, which claims the benefit of U.S. Provisional application Ser. No. 60/572,758 filed May 21, 2004, the entire contents of both of which are herein incorporated by reference.

FIELD OF THE INVENTION

The present invention relates to a primer composition and uses thereof. In particular, the present invention relates to a primer comprising an epoxy-modified polymer selected from the group consisting of an epoxy-modified-thermoplastic polymer, an epoxy-modified-thermoplastic polymeric composite, an epoxy-modified-elastomeric polymer, an epoxy-modified-elastomeric polymeric composite, a blend thereof, and any mixture thereof. The primer is useful in the repair, insertion, assembly and coating of thermoplastic and/or elastomeric substrates.

BACKGROUND OF THE INVENTION

The low polarity (hydrophobicity) and inert characteristics of the surface of many thermoplastic and elastomeric polymers, especially polyolefins (PO), cause many problems in the repair, assembly, insertion and coating of these polymers with the same or other materials, especially in structural applications. Hot-melt adhesives are often used, because they are able to penetrate into the polymer surface to create good fusion bonding with the polymeric matrix. To promote the fusion bonding process, heat-gun, hotplate, ultrasonic, vibration, and resistance welding may be applied. Alternatively, surface treatment by plasma, flame, or laser, which allows joining of parts by conventional adhesives, is also sometimes used.

For hot-melt adhesives, heat-gun techniques are not sufficient for joining large areas and it is very difficult to control the uniformity and reproducibility of the joint. In addition, when assembling dissimilar materials, it is not always possible to find an adhesive that provides good bonding with both substrates. In hotplate welding, high temperature is always required for good fusion bonding, and this is not always easy to accomplish for large and/or thin parts with complex shape. Similarly, vibration and ultrasonic welding also present difficulties in joining large parts with complex shapes, and in controlling fibre alignment. Furthermore, especially for PO composites, and especially in structural applications, strong enough adhesion is required to carry the load into/through the joint. Commercial hot-melt adhesives cannot sustain such high load levels while surface treatment techniques are not always practical in industrial applications.

Primers have been used in the past to improve adhesion between two surfaces.

U.S. Pat. No. 6,344,500 issued on Feb. 5, 2002 to Ogawa et al. discloses an aqueous primer coating composition comprising a blend of an acid anhydride-modified poly(olefin chloride) emulsion resin, an aqueous alkyd resin and an aqueous novolac-type epoxy resin for coating a plastic material to impart gasohol resistance.

U.S. Pat. No. 6,337,134 issued on Jan. 8, 2002 to Takai discloses a primer composition for paint comprising a blend of 100 parts by weight of an epoxidized EPDM and 50 to 70 parts by weight of a product of chlorination of a polyolefin modified with an unsaturated carboxylic acid or an anhydride thereof.

U.S. Pat. No. 6,494,983 issued on Dec. 17, 2002 to Graue et al. discloses a cured enamel coating for a metal surface comprising a solids mixture of an epoxy resin, a phenolic resin, carboxy-polyolefin resin and polyester resin.

U.S. Pat. No. 6,497,337 issued Dec. 24, 2002 to Kehe discloses an enamel comprising a blend of a cresol-formaldehyde/epoxy resin and maleic anhydride-modified polypropylene resin adhesion promoter.

U.S. Pat. No. 6,391,461 issued May 21, 2002 to Ryntz et al. discloses a method of improving adhesion to thermoplastic olefins using an adhesion promoter selected from the group consisting of a chlorinated polyolefin, a hydrogenated poly (butadiene)diol, and mixtures thereof.

There remains a need for an effective and easy to use primer for use in the repair, assembly, insertion and/or coating of thermoplastic and/or elastomeric substrates, especially with other dissimilar materials like, for example, thermosets and their composites, thermoplastics and their composites, elastomers, metals, ceramics, wood, leather, fabrics, etc. For example, there remains a need for a primer particularly useful for providing high bond strength in the repair, assembly and/or insertion of thermoplastic and/or elastomeric composites.

SUMMARY OF THE INVENTION

In a first aspect, there is provided a primer for a thermoplastic and/or elastomeric substrate, the primer comprising a film of an epoxy-modified polymer selected from the group consisting of an epoxy-modified-thermoplastic polymer, an epoxy-modified-thermoplastic polymeric composite, an epoxy-modified-elastomeric polymer, an epoxy-modified-elastomeric polymeric composite, a blend thereof, and any mixture thereof.

In a second aspect, there is provided a method of repairing, inserting, assembling or coating a thermoplastic or elastomeric substrate, the method comprising: applying to the substrate, a primer comprising a film of an epoxy-modified polymer selected from the group consisting of an epoxy-modified-thermoplastic polymer, an epoxy-modified-thermoplastic polymeric composite, an epoxy-modified-elastomeric polymer, an epoxy-modified-elastomeric polymeric composite, a blend thereof, and any mixture thereof; and, applying a repair, insertion, assembly or coating material to the primer.

In a third aspect, there is provided a method of repairing a thermoplastic or elastomeric substrate, the method comprising: applying to the substrate, a primer comprising a film of an epoxy-modified polymer selected from the group consisting of an epoxy-modified-thermoplastic polymer, an epoxy-modified-thermoplastic polymeric composite, an epoxy-modified-elastomeric polymer, an epoxy-modified-elastomeric polymeric composite, a blend thereof, and any mixture thereof; applying a thermoset resin or thermoset composite to the primer on the substrate; and, setting the thermoset resin or thermoset composite.

In a fourth aspect, there is provided a method of assembling an article, the method comprising: applying to a thermoplastic or elastomeric substrate, a primer comprising a film of an epoxy-modified polymer selected from the group consisting of an epoxy-modified-thermoplastic polymer, an epoxy-modified-thermoplastic polymeric composite, an epoxy-modified-elastomeric polymer, an epoxy-modified-elastomeric polymeric composite, a blend thereof, and any mixture thereof; applying an adhesive to the primer on the substrate, applying an assembly material to the adhesive, and, setting the adhesive.

In a fifth aspect, there is provided a method of coating a thermoplastic or elastomeric substrate, the method comprising: applying to the substrate, a primer comprising a film of an epoxy-modified polymer selected from the group consisting of an epoxy-modified-thermoplastic polymer, an epoxy-modified-thermoplastic polymeric composite, an epoxy-modified-elastomeric polymer, an epoxy-modified-elastomeric polymeric composite, a blend thereof, and any mixture thereof; and, applying a coating material to the primer to thereby coat the substrate.

In a sixth aspect, there is provided a method of repairing, inserting assembling or coating an article, the method comprising: placing a thermoplastic or elastomeric substrate in a mold; placing a primer comprising a film of an epoxy-modified polymer selected from the group consisting of an epoxy-modified-thermoplastic polymer, an epoxy-modified-thermoplastic polymeric composite, an epoxy-modified-elastomeric polymer, an epoxy-modified-elastomeric polymeric composite, a blend thereof, and any mixture thereof in the mold; placing a repair, insertion, assembly or coating material in the mold; and, heating to form a molded article.

In a seventh aspect, there is provided an article of manufacture comprising a polyolefin and a primer on the polyolefin, the primer comprising an epoxy-modified-carboxyl-grafted-polyolefin.

DETAILED DESCRIPTION

As used in the specification and the appended claims, the singular forms "a," "an" and "the" include plural referents unless the context clearly dictates otherwise.

Primer:

The epoxy-modified polymer can be conveniently considered as comprising two components: a thermoplastic or elastomeric polymer component and an epoxy-containing component attached to the thermoplastic or elastomeric polymer component. The primer may be a homopolymer, copolymer, blend or mixture thereof. The primer may be a composite comprising the epoxy-modified polymer and a reinforcing material for example, fibers, layered crystalline clays, particle fillers, whiskers, nanotubes, metallic oxides, metallic sulfides, metallic layered double hydroxides, or any mixture thereof.

Any suitable thermoplastic polymer may be used as the thermoplastic polymer component. For example, some suitable thermoplastic polymers include, olefinics (i.e. polyolefins), vinylics, styrenics, acrylonitrilics, acrylics, cellulosics, polyamides, thermoplastic polyesters, thermoplastic polycarbonates, polysulfones, polyimides, polyether/oxides, polyketones, fluoropolymers, copolymers thereof, or any mixture thereof. Polyolefins, polyamides and thermoplastic polyesters are of particular note, for example, homopolymers, copolymers, terpolymers, or mixtures of polyolefins, polyamides and thermoplastic polyesters. Some suitable polyolefins include, for example, polypropylene, polybutylene, polymethylpentene, polyethylenes (e.g., LDPE, HDPE, LLDPE, UHMWPE, XLPE, copolymers of ethylene with another monomer (e.g., ethylene-propylene copolymer)), or any mixture thereof. Polypropylene and its derivatives are of particular note. Some suitable thermoplastic polyesters include, for example, polyethylene terephthalate, polycarbonate, polyetherketone, and biodegradable polyesters such as polylactic acid (PLA), polyhydroxyalkanoate (PHA) and their geometric and optical (e.g. D and L) isomers.

Any suitable elastomeric polymer may be used as the elastomeric polymer component. For example, some suitable elastomeric polymers include, polyisoprene, polybutadiene, polychloroprene, polyisobutylene, styrene-butadiene rubber, acrylonitrile-butadiene rubber, ethylene-propylene rubber, ethylene-propylene-diene rubber, chlorinated polyethylene, chlorosulfonated polyethylene, ethylene-vinyl acetate copolymer, ethylene-acrylate copolymer, fluoroelastomers (e.g. polyvinylidene fluoride, polytrichlorofluoroethylene), silicone polymers (e.g. polydimethylsiloxane), acrylic rubber, epichlorohydrin rubber, pulysulfide rubbers, propyleneoxide rubbers, polynorbornene, polyorganophosphazenes, olefinic thermoplastic rubbers, styrenic thermoplastic rubbers, urethane thermoplastic rubbers, etherester thermoplastic rubbers, etheramide thermoplastic rubbers, or any mixture thereof.

The epoxy-containing component of the primer may be derived from any suitable epoxy compound. Epoxy-containing components comprising one or more glycidyl groups are of particular interest. Examples include glycidyl methacrylate, glycidyl acrylate, glycidyl-2-ethyl acrylate, glycidyl-2-propyl acrylate, monoglycidyl itaconate, monoglycidyl butenetricarboxylate, diglycidyl butenetricarboxylate, glycidyl ester of maleic acid, glycidyl ester of crotonic acid, glycidyl ester of fumaric acid, alpha-chloroallyl glycidyl ester, diglycidyl ether of bis-phenol A, diglycidyl ether of p-aminophenol, N,N,N',N'-tetraglycidyl-4,4'-methylene-bis-benzene amine, 4-glycidyloxy-N,N'-diglycidylaniline, tetraglycidyl diamino diphenyl methane, diglycidyl ether of bis-phenol A novolac resin, epoxy phenol novolacs, epoxy cresol novolacs, allyl glycidyl ether, methallyl glycidyl ether, isopropenylphenyl-glycidyl ether, vinyl glycidyl ether, glycidyl oxyethylvinyl ether, styrene-p-glycidyl ether, p-glycidyl styrene, epichlorohydrin, polynuclear phenolepoxy, hydantoin epoxy, etc. Specific examples include EPON™ 1004 (a bisphenol A base epoxy resin from Shell Chemicals), EPON™ SU-3 (a bisphenol A and novolac base epoxy resin from Shell Chemicals), Araldite™ MY0510 (diglycidyl ether of para-aminophenol base epoxy resin from Vantico) and Araldite™ MY 727 (N,N,N',N'-tetraglycidyl-4,4'-methylene-bis-benzenamine base epoxy resin from Vantico).

The primer may be made by suitable reaction between a thermoplastic or elastomeric polymer and an epoxy compound. Grafting reactions in which the epoxy compound is grafted on to the thermoplastic or elastomeric polymer are of particular note. Alternatively, the epoxy compound may be grafted on to a monomer of a thermoplastic or elastomeric polymer and the monomer then polymerized or copolymerized to form an epoxy grafted thermoplastic or elastomeric polymer. The epoxy compound may be grafted to a thermoplastic or elastomeric polymer or a monomer thereof either directly or through a coupling agent.

When the epoxy compound is grafted directly to the thermoplastic or elastomeric polymer, the epoxy compound must comprise a functional group that permits grafting to the polymer. Reference is made to Table 1 for an exemplary list for matching functional groups to some polymers. One skilled in the art will readily recognize other possible combinations.

TABLE 1

| Polymer | Functional group |
|---|---|
| Polyolefins - homopolymers and copolymers | Olefinic bond |

TABLE 1-continued

| Polymer | Functional group |
|---|---|
| Polyamide | Epoxide, hydoxyl, ester, acid |
| Thermoplastic polyester | Epoxide, hydroxyl, phenol, ester, acid |

When the desired epoxy compound cannot be directly grafted or is difficult to graft to the desired polymer, a coupling agent is required. In this case, there are a variety of choices of coupling agent. One functional group on the coupling agent permits grafting to the thermoplastic or elastomeric polymer while another functional group on the coupling agent must be able to react with a functional group on the epoxy compound. Selection of a functional group for grafting to the polymer is well within the ability of one skilled in the art, with Table 1 providing an exemplary list for guidance. Selection of appropriate functional groups for reaction between the coupling agent and the epoxy compound is also well within the ability of one skilled in the art. Reference is made to Table 2 for an exemplary list for matching reactive functional groups between the coupling agent and the epoxy compound. One skilled in the art will readily recognize other possible combinations.

TABLE 2

| Functional Group on Coupling Agent | Functional Group on Epoxy Compound |
|---|---|
| Vinyl | Hydride |
| Vinyl | Alcohol |
| Vinyl | Alkyl halide |
| Phenol | Alkyl halide |
| Isocyanate, Isothiocyanate | Alcohol (hydroxyl) |
| Acid chloride | Phenol |
| Acid chloride | Alcohol (hydroxyl) |
| Acid chloride | Amide |
| Anhydride | Epoxy |
| Carboxylic acid | Alcohol (hydroxyl) |
| Ester | Alcohol (hydroxyl) |
| Carboxylic acid | Epoxy |
| Amide | Acid chloride |
| Alcohol (hydroxyl) | Vinyl |
| Alcohol (hydroxyl) | Acid chloride |
| Alcohol (hydroxyl) | Ester |
| Alcohol (hydroxyl) | Carboxylic acid |
| Amine | Anhydride |
| Amine | Acid chloride |
| Amine | Epoxide |
| Amine | Carboxylic acid |

Coupling agents with amine, hydroxyl, ester, carboxylic acid or carboxylic acid anhydride functional groups are of particular note. For example, unsaturated carboxylic acids, unsaturated carboxylic acid anhydrides or mixtures thereof may be specifically mentioned. Some suitable unsaturated carboxylic acids include, for example, acrylic acid, maleic acid, tetrahydrophthalic acid, fumaric acid, itaconic acid, nadic acid, and methylnadic acid. Some suitable anhydrides include, for example, maleic anhydride, tetrahydrophthalic anhydride, fumaric anhydride, itaconic anhydride, nadic anhydride, and methylnadic anhydride. Maleic anhydride is of particular note.

There are a number of commercially available compounds in which an unsaturated carboxylic acid or unsaturated anhydride has already been grafted on to a thermoplastic polymer. For example, maleic anhydride grafted polyolefins like Epolene™ E-43, G-3015, G-3003, C-16, C-18, G-XX01, G-XX15 from Eastman Chemicals, and Polybond™ 3002, 3009, 3150, 3200 from Crompton; and, acrylic acid grafted polyolefins like Polybond™ 1001, 1009 from Crompton.

Grafting of an epoxy compound or a coupling agent onto a thermoplastic or elastomeric polymer is often accomplished by using a free radical initiator or some form of activating energy (e.g., actinic radiation, heat, etc.). Free radical initiators are well known and one skilled in the art can readily select an appropriate initiator for the particular grafting reaction desired. Dialkyl peroxides, such as 1,1-bis(t-butylperoxy)-3,3,5-trimethyl cyclohexane or 2,5-dimethyl-2,5-(di-ter-butylperoxy)-hexane are examples of one class of suitable free radical initiators. Free radical initiators are preferably used in an amount of from about 0.1 to about 3.0 parts by weight, more preferably from about 0.5 to about 2.0 parts by weight, based on 100 parts by weight of polymer matrix portion.

The grafting process is usually performed at a suitable temperature above the melt or glass transition temperature of the thermoplastic or elastomeric polymer (e.g. about 150-300° C., depending on the chemistry of the polymer) for a sufficient reaction time (e.g. about 5-600 seconds, particularly about 30-240 seconds). The grafting process is typically performed in a mixer, such as, for example, in an extruder, an internal mixer or a sigma blade mixer.

The amount of epoxy compound used in the grafting process is preferably from about 0.1 to about 40 parts by weight, more preferably from about 0.3 to about 20 parts by weight, for 100 parts by weight of the thermoplastic or elastomeric polymer. In some cases, initiators like peroxide compounds must be used together with the epoxy compounds, for example, in the case of polyolefins. A catalyst may also be used to accelerate the grafting reaction.

When epoxy compound and coupling agent are both used, the coupling agent is first grafted on to the thermoplastic or elastomeric polymer under conditions as described above. The amount of coupling agent is preferably from about 0.1 to about 20 parts by weight, more preferably from about 0.2 to about 10 parts by weight, for 100 parts by weight of the thermoplastic or elastomeric polymer. Grafting of the epoxy compound on to the coupling agent-grafted polymer follows via reaction of the functional group on the epoxy compound with the functional group on the coupling agent. The grafting of the epoxy compound is usually performed at a suitable temperature above the melt or glass transition temperature of the coupling agent-grafted polymer (e.g. about 150-300° C., depending on the chemistry of the polymer) for a sufficient reaction time (e.g. about 0.5-60 minutes, depending on the chemistry of the epoxy compound and of the polymer). The weight ratio of epoxy compound to coupling agent may be about 1-40 parts epoxy compound to about 1 part coupling agent.

Generally, during a grafting process, the free radical initiator may be mixed with a thermoplastic or elastomeric polymer before the addition of epoxy compound or coupling agent, mixed with epoxy compound or coupling agent before combining with a thermoplastic or elastomeric polymer, or mixed with a melt of the thermoplastic or elastomeric polymer and epoxy compound or coupling agent. Contacting the components of the graft reaction is preferably done for a time period sufficient to graft from about 10 percent to about 90 percent of the epoxy compound or coupling agent to the thermoplastic or elastomeric polymer. In an extruder, for example, a residence time of about one to about ten seconds is generally sufficient for the grafting of the epoxy compound or coupling agent onto the polymer, but this greatly depends on the amount and type of free radical initiator present.

Other components may be present in the primer. For example, non-epoxidized thermoplastic or elastomeric polymers or mixtures thereof may be present. Such non-epoxidized polymers may be unreacted reactants from the original reaction, may be additional components or may be a combination of both. The non-epoxidized polymers may be the same or different as the polymer components of the epoxy-modified polymers. Epoxy compounds, for example, unreacted epoxy compounds from the original reaction or additional epoxy compounds may be present. Additional epoxy compounds may be the same or different as the epoxy-containing component of the epoxy-modified polymers. Other additives may also be present, for example, oxidation and/or degradation prevention agents (e.g. antioxidants), performance enhancers (e.g. reinforcements, nano-reinforcements, fire retardants, etc.), workability enhancers (e.g. pigments, plasticizers, etc.).

In use, the primer composition is applied to a substrate surface as a film. The film is preferably relatively thin compared to the thickness of the substrate. The thickness of the film will depend on the particular application. The film may have a thickness in a range of from about 5 μm to about 500 μm, more particularly from about 10 μm to about 500 μm, even more particularly from about 30 μm to about 80 μm.

Repair, Insertion, Assembly and Coating of Thermoplastic and/or Elastomeric Substrates:

Normally, a thermoplastic or elastomeric substrate is incompatible with typical materials such as thermoset matrices, some thermoplastic or elastomeric matrices and other materials (e.g. wood, metal, ceramics, etc.) used in the repair, insertion, assembly or coating of substrates, and articles fabricated from substrates. However, the primer of the present invention permits convenient repair, insertion, assembly and coating of thermoplastic and elastomeric substrates with such materials. The primer may be used in any suitable process, for example, in lapshear repair, scarf butt joint repair, etc. The primer may also be used in insertion and assembly processes in which a thermoplastic or elastomeric substrate is bonded to different materials, for example metals, wood, ceramic, leather, fabrics and other composites using commercial adhesives. The primer may also be used in coating processes in which a thermoplastic or elastomeric substrate is coated with a coating material, for example, paint, varnish, etc.

In a typical repair process, a damaged area of a thermoplastic or elastomeric substrate may be removed to expose a fresh surface. For example, if the repair is to be done by the butt joint method, a bevel angle of about 2-6°, for example, is made in the area to be repaired. At bevel angles of 30° or higher, restoration of tensile strength is more difficult, thus bevel angles of less than 30° are preferred in the butt joint method. In another example, the repair may be done by the batch joint method, which is particularly useful when the substrate thickness is thin (e.g. less than 3 mm). Whichever method is used, the primer is then applied as a film to the surface of the substrate by any suitable technique, for example, by fusion techniques using a heat gun, resistance welding, ultrasonic welding, vibration welding, or molding.

Then, in one aspect, a repair material comprising an uncured thermoset, thermoplastic or elastomeric resin, for example, may be applied directly on to the primer, for example, by the hand lay-up method, spray-up method, injection molding, air-bag molding, vacuum bag molding, compression molding, RTM (resin transfer molding), autoclave, thermo-forming, etc. The resin may then be set to thereby repair the damaged area of the substrate. In this aspect, the repair material typically has good adhesion to the primer. In the case of thermoplastic or elastomeric repair materials, the repair material may be applied as a monomer and subsequently polymerized.

In another aspect, an adhesive may be applied to the primer and a repair material applied to the adhesive. Application techniques as described previously may be used to apply the repair material to the adhesive. This aspect may be used with any types of repair material, for example, cured or uncured thermosets, thermoplastics, elastomers, wood, metal, ceramics, etc. In this aspect, the repair material does not need to have good adhesion directly to the primer.

In yet another aspect, a thermoplastic or elastomeric substrate, a primer and a repair material may all be placed together in a mold and molded together simultaneously. In some instances, the inclusion of an adhesive may be beneficial.

Generally, molding may be done with or without heat, although it is generally desirable to mold with heat above the softening temperature of the polymeric components. Additionally, molding may be performed at normal pressure, at high (increased) pressure (i.e. compression) or at low (decreased) pressure (i.e. vacuum).

All of the above repair techniques may also be easily adapted to the insertion, assembly or coating of thermoplastic or elastomeric substrates.

The thermoplastic or elastomeric substrate may be any suitable substrate comprising a thermoplastic or elastomeric polymer as described above. The substrate may be a homopolymer, a copolymer, a blend of homopolymers, copolymers or both, a composite of a polymer matrix and a reinforcing material, etc. The substrate may be reinforced, for example, by fibers, fillers, layered crystalline clays, whiskers, nanotubes, metallic oxides, metallic sulfides, metallic layered double hydroxides, or mixtures thereof. Fiber reinforcements are of particular interest.

Thermoset resins useful as repair, insertion, assembly or coating materials may be any suitable thermoset matrix, for example, thermoset composites, thermoset adhesives, etc. Thermoset composites include, for example, polyurethanes, epoxy-based composites, vinylesters, polyesters, etc. Thermoset composites may be reinforced, for example, by fibres, fillers, layered crystalline clays, whiskers, nanotubes, metallic oxides, metallic sulfides, metallic layered double hydroxides, or mixtures thereof. Fiber reinforcements are of particular interest. Thermoset adhesives include, for example, epoxy resins, polyurethanes, cyanoacrylates, etc.

Thermoplastic and elastomeric repair, insertion, assembly or coating materials may comprise any suitable thermoplastic or elastomeric matrix, composite and/or adhesive. For example, the thermoplastic and elastomeric polymers and composites described above are suitable. The substrate may be a homopolymer, a copolymer, a blend of homopolymers, copolymers or both, a composite of a polymer matrix and a reinforcement, etc. The material may be reinforced, for example, by fibers, fillers, layered crystalline clays, whiskers, nanotubes, metallic oxides, metallic sulfides, metallic layered double hydroxides, or mixtures thereof. Fiber reinforcements are of particular interest.

Specific coating materials are well known to one skilled in the art and include, for example, organic coatings, gelcoats, electrostatic coatings, paints, varnishes, powder coatings, mixtures thereof, etc. In coating applications the primer may be applied as a film to the surface of a substrate by any suitable technique as described above. The coating material can then be applied to the primer by any suitable technique, for example, brushing, rolling, dipping, spraying, etc.

The primer of the present invention provides a variety of advantages. For example, in repair methods, the primer is very simple and easy to use so that anyone can use it without a need for specialized training; repair can be done at room temperature without pressure permitting repair to be done in any setting without specialized equipment; repair can be done on large parts even in the field; repair is inexpensive while permitting great flexibility for different geometric complexities; and a variety of different materials may be used in the repair. In assembly and insertion methods, the primer may be used in bonding thermoplastic and/or elastomeric substrates to a variety of other materials (e.g. other composites, metals, wood, etc.); the primer permits flexibility in choice of adhesive, large parts may be assembled even in the field; and, excellent structural joint strength is achieved. Repairs, insertions, assemblies and coatings made using the primer of the present invention are resistant to wet and humid conditions as well as to high and low temperatures. Good bond strength is maintained down to about −30 degrees Celsius and is optimal in the range of about 0-50 degrees Celsius.

A variety of articles may be repaired, inserted, assembled or coated using methods of the present invention. Such articles include, for example, sporting goods (e.g. skis, snow boards, snowmobiles, etc.), structural automotive parts (e.g. bumpers, frames, bodies, roofs, doors, etc.), construction parts (e.g. roofs, walls, ceilings, floors, decks, etc.), marine parts (e.g. boat hulls, canoe bodies, etc.), electronic devices, etc.

For compatibility between the primer and the thermoplastic or elastomeric substrate, it is advantageous to choose a primer with a thermoplastic or elastomeric polymer component that is compatible with the thermoplastic or elastomer of the substrate. In a given instance, it is preferred that the primer be based on a polymer that is the same as or very similar to that of the thermoplastic or elastomeric polymer, or at least one that has a good chemical and/or physical interaction with the thermoplastic or elastomeric substrate. Matching the thermoplastic or elastomeric polymers increases compatibility between the primer and the thermoplastic or elastomeric substrate leading to greater bond strength.

Since the primer also comprises an epoxy-containing component, the primer will also interact well, for example by chemical reaction or physical interaction, with functional groups present in the material used for repair, insertion, assembly or coating or with functional groups present in the adhesive if an adhesive is used. When the material is a thermoset matrix, the epoxy-containing component of the primer may react with any aspect of the thermoset matrix, for example, the backbone (e.g. urethane groups of polyurethane or ester groups of polyesters), the hardener (e.g. anhydride, acid, cyanate, amine or amide groups of the hardener in epoxy resins), etc. When the material used for repair, insertion, assembly or coating is thermoplastic or elastomeric, the epoxy-containing component of the primer may react with any aspect of the thermoplastic or elastomer matrix, for example, the backbone (e.g. amide groups of polyamide or ester groups of polyesters), the end groups (e.g. acid and hydroxy groups in polyesters, amine and acid groups in polyamides, alcohol or amine groups in functionalised-terminated rubber), etc. Adhesion is not limited to chemical interaction, but also includes physical interactions between the epoxy-containing component and the repair, insertion, assembly or coating material that leads to strong van der Waals interaction and/or hydrogen bonding, etc. It is also preferred to use a material for repair, insertion, assembly or coating that more readily interacts with the epoxy-containing component of the primer. This also leads to greater bond strength.

BRIEF DESCRIPTION OF THE DRAWINGS

In order that the invention may be more clearly understood, preferred embodiments thereof will now be described in detail by way of example, with reference to the accompanying drawings, in which.

EXAMPLES

Abbreviations and Definitions:
PP=polypropylene
MA=maleic anhydride
MAgPP=maleic anhydride graft polypropylene
Twintex™=a glass fiber reinforced polypropylene substrate
GF=glass fibers
Preparation of Primers:

Three different primers comprising epoxy-modified-maleic anhydride-graft-polypropylene (E-MAgPP) were prepared from the reaction of three different epoxy resins with MAgPP. The epoxy resins used were Epon™ SU-3 (Shell Chemicals), Epon™ 1004 (Shell Chemicals) and Epon™ 1004 with 5% dioctyl phthalate (DOP—a plasticizer). Epon™ SU-3 is a bispehenol A and novolac base epoxy. Epon™ 1004 is a bisphenol A base epoxy. The MAgPP used was Polybond™ 3150 (Crompton).

Primer 1: Epon™ SU-3 (25 g), Polybond™ 3150 (100 g) and antioxidant (1 g) (Igranox™ MD 1024 (Ciba-Geigy)) were reacted in a Brabender plasticorder mixer at a mixing speed of 60 rpm for 30 minutes at 220° C. to form the primer. The melting point of the resulting Primer 1 was found to be 156° C., the glass transition temperature was 5° C. and the degree of crystallinity was 34%.

Primer 2: The same procedure as for Primer 1 was used to prepare Primer 2 using Polybond™ 3150 (100 g) and Epon™ 1004 (10 g) with 5% DOP.

Primer 3: The same procedure as for Primer 1 was used to prepare Primer 3 using Polybond™ 3150 (100 g) and Epon™ 1004 (20 g) with 5% DOP.

Primer 4: The same procedure as for Primer 1 was used to prepare Primer 4 using Epolene™ 3105 (100 g) and Epon™ 1004 (20 g).

Primer 5: The same procedure as for Primer 1 was used to prepare Primer 5 using Epolene™ 43 (100 g) and Epon™ 1004 (20 g). Gelation occurred during the reaction. It is believed that when the concentration of coupling agent is as high as that of Epolene™ 43, chemical reaction between the epoxy and the coupling agent (maleic anhydride) is difficult to control, leading to the formation of three dimensional networks.

Two different primers comprising epoxy-modified-polyethylene terephthalate (a thermoplastic polyester) and epoxy-modified-polyamide-6 (a polyamide) were prepared from the reaction of epoxy Araldite™ MY 0510 (from Vantico) with polyethylene terephthalate (PET) and polyamide-6 (PA-6). The PET was PET Eastapak™ 9921 and the PA-6 was UBE 1015B having a molecular weight of 15 kg/mol.

Primer 6: Araldite™ (4 wt %) was side fed into a Leistritz twin-screw extruder charged with Eastapak™ 9921 (96 wt %)

at a rate of 5 kg/h. The temperature in all extruder zones was 270° C., the screw speed was 200 rpm, the outlet pressure was 250 psi and the residence time was 1.5 min. The screw diameter was 34 mm with L/D of 40.

Primer 7: Araldite™ (4 wt %) and UPE 1015 (96 wt %) were fed into a Haake mini-compounder at a temperature of 240° C. The screw speed was 100 rpm and the circulation time was 5 min.

Repair of Twintex™ with Thermoset Composites:

In this Example, the use of a primer of the present invention in the repair of a glass reinforced polypropylene composite (Twintex™) with various thermoset resin matrices was explored. The thermoset resin matrices explored were thermoset composites comprising glass fiber reinforced epoxy (epoxy/GF) or glass fiber reinforced polyurethane (PU/GF). For comparison (referred to as "Reference", the repair of Twintex™ with epoxy/GF was also done in the same way without primer). The quality of the repair was evaluated by means of lapshear and scarf butt joint test methods.

Figure 1:
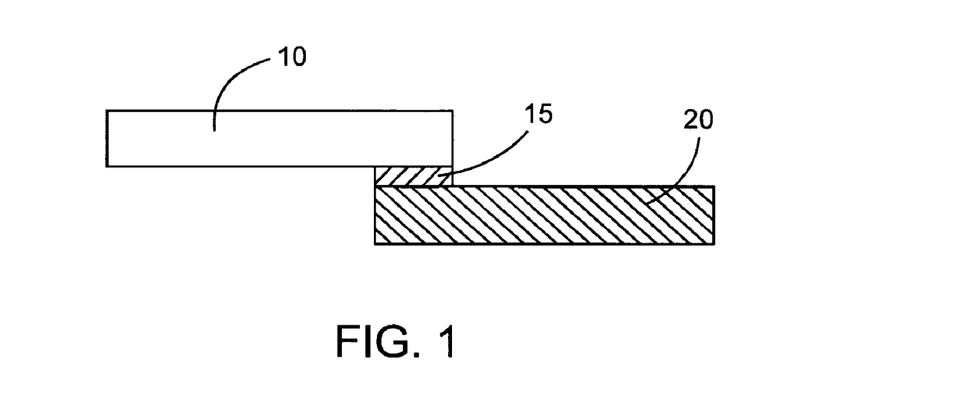
FIG. 1 is a schematic representation of a lap shear joint configuration in which a primer of the present invention is used to bond a thermoplastic polymer substrate to a thermoset composite matrix; and, FIG. 2 is a schematic representation of a scarf butt joint configuration in which a primer of the present invention is used to bond a thermoplastic polymer substrate to a thermoset composite matrix.

In the lap-shear repair method, a thin film (about 30 μm) of Primer 1 was fused to a flat surface of a Twintex™ substrate at a temperature above the melting point of the primer (180-200° C.) using a heat gun. The temperature and power level of the heat gun and the time to apply the heat gun on the Twintex™ substrate were controlled to avoid overheating the thermoplastic composite substrate. A thin film of polyimide was introduced on the primer surface before applying the heat gun to avoid having the primer stick to the heat gun. Since the energy provided by the heat gun was just enough to melt the primer and a thin layer of the Twintex™ substrate to ensure a good adhesion between them, the primer was cooled very quickly and the film was then released. A thermoset resin was applied to the primed area of the Twintex™ substrate by the hand lay-up method and allowed to set. Referring to FIG. 1, the lapshear joint configuration is illustrated in which the Twintex™ substrate (10) is bonded to the thermoset composite (20) with primer (15) in between.

Figure 2:
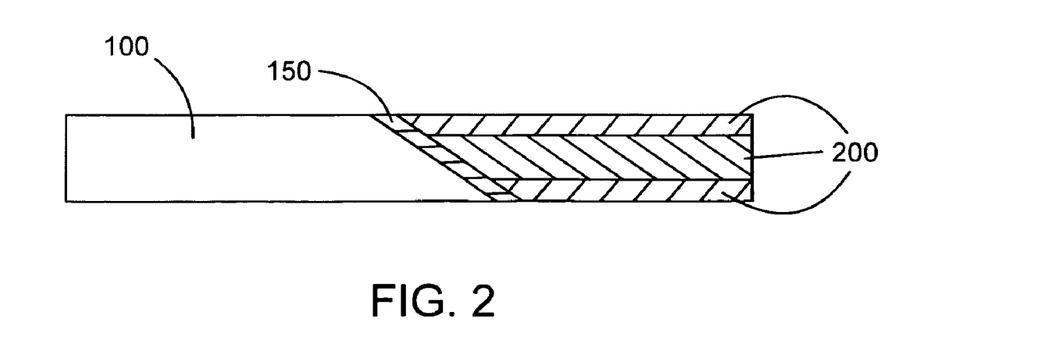

In the scarf butt joint repair method, a damaged area of a Twintex™ substrate was removed and a bevel angle of about 6° cut at the area to be repaired. A thin film (about 30 μm) of Primer 1 was fused to the beveled surface of the Twintex™ substrate at a temperature above the melting point of the primer (180-200° C.) using a heat gun. A thermoset composite was applied to the primed area of the Twintex™ substrate by the hand lay-up method and allowed to set. Referring to FIG. 2, the scarf butt joint configuration is illustrated in which the Twintex™ substrate (100) is bonded to several strips of the thermoset composite (200) with primer (150) in between.

Strengths of the joints formed using Primer 1 in the above methods are provided in Table 3. Lap-shear strength relates to the strength of the lap-shear joint while tensile strength relates to the strength of the scarf butt joint.

TABLE 3

| Thermoset Composite | Lap-shear Strength (MPa) | Tensile Strength (MPa) |
|---|---|---|
| PU/GF | 11.5 | 136 |
| Epoxy/GF | 13.4 | 146 |
| Reference | 0.5 | 3 |

In both the lapshear joint and scarf butt joint repair methods, the polyurethane and epoxy thermoset composites provided very good results. It is thought that chemical reaction of epoxy groups in the primer with isocyanate groups in the polyurethane composite or with amine groups in the hardener of the epoxy composite are responsible for the better performance. In all cases bond failure was mainly due to failure of the Twintex™ substrate, indicating excellent adhesion between the primer and the two composites. The scarf butt joint results indicate that repair using epoxy/GF can restore about 60% of the original tensile strength of the Twintex™ substrate while repair with PU/GF can restore about 55% of the original tensile strength of the Twintex™ substrate. A better result for Epoxy/GF is thought to be due to better interaction between the hardener of the thermoset matrix and the epoxy of the primer.

Similar tests were performed in which the primer was placed in a mold and molded with the Twintex™ prepreg instead of being applied using a heat gun. Similar results were obtained.

The effect of bevel angle on scarf butt joint repair in epoxy/GF repair of Twintex™ using Primer 1 was examined. Table 4 provides results. It is evident from Table 4 that smaller bevel angles provide better bond strength, presumably due to the increased bonding area and reduced shear stress at the bond line. At a bevel angle of 2°, 60% of the original tensile strength of the Twintex™ substrate can be restored, as compared to 20% at a bevel angle of 30°.

TABLE 4

| Bevel Angle | Tensile Strength (MPa) |
|---|---|
| 2° | 168 |
| 6° | 146 |
| 15° | 65 |
| 30° | 50 |

The effect of temperature on lapshear and scarf butt joint strength was examined for epoxy/GF repair of Twintex™ using Primer 1. Table 5 provides results. The lap-shear strength relates to lapshear repair while the tensile strength relates to scarf butt joint repair using a bevel angle of 6°. It can be seen that good bond strength is maintained down to a temperature of about $-30$-° C. Above 80° C., bond strength declines, probably due to incompatibility in thermal expansion between the two substrates and the low heat deflection temperature of the PP matrix of the substrate and of the primer.

TABLE 5

| Temperature (° C.) | Lap-shear Strength (MPa) | Tensile Strength (MPa) |
|---|---|---|
| −30 | 9.0 | 97 |
| 0 | 10.9 | 113 |
| 25 | 13.4 | 146 |
| 50 | 11.0 | 115 |
| 80 | 3.6 | 38 |

The effect of moisture on lapshear and scarf butt joint strength was examined for epoxy/GF repair of Twintex™ using Primer 1. Joints prepared from Twintex™ substrates were exposed to humid (a saturated humid chamber) and wet (immersed in water) environments at temperatures of 50° C. and 95° C. for a period of 48 hours. Table 6 provides results. The lap-shear strength relates to lapshear repair while the tensile strength and the tensile modulus relate to scarf butt joint repair using a bevel angle of 6°. It is evident from Table 6 that the bond formed is highly resistant in a saturated atmosphere (a humid environment) up to 95° C. Tensile strength is more sensitive immersed in water (a wet environment) than tensile modulus or lap-shear strength, but is still quite good.

The results indicate that repair using a primer of the present invention can be maintained in humid and wet environments.

TABLE 6

| Conditions | Lap-shear Strength (MPa) | Tensile Strength (MPa) | Tensile Modulus (GPa) |
|---|---|---|---|
| Ambient | 13.4 | 146 | 8.2 |
| 100% humidity (humid) 50° C. | 10.6 | 116 | 8.0 |
| In water (wet) 50° C. | 9.2 | 91 | 7.9 |
| 100% humidity (humid) 95° C. | 9.9 | 112 | 7.9 |
| In water (wet) 95° C. | 8.9 | 40 | 7.7 |

Assembly of Twintex™ with Epoxy/Glass Fiber Composites:

In this Example, the lap-shear bond strengths of Twintex™ bonded to an epoxy/glass fiber (epoxy/GF) composite using Primer 1 and a commercial epoxy adhesive (30 min Epoxy Lepage) were evaluated. To assemble articles, a thin film of Primer 1 was fused to a Twintex™ substrate at a temperature above the melting point of the primer (180-200° C.) using a heat gun as described previously. The epoxy adhesive was then applied to the primer at room temperature and the prepared epoxy/glass fiber composite was then applied to the adhesive. The adhesive was then allowed to harden. Table 7 compares the effect of film thickness and the epoxy content used for the preparation of the primer film on lap-shear strength of the bond formed between the Twintex™ substrate and the epoxy/GF composite.

TABLE 7

| Film Thickness (μm) | Epoxy Content of Film | Lap-shear Strength (MPa) |
|---|---|---|
| None | None | 0.3 |
| 80 | 10 wt % (Primer 2) | 2.8 |
| 30 | 10 wt % (Primer 2) | 6.4 |
| 80 | 20 wt % (Primer 3) | 6.8 |
| 30 | 20 wt % (Primer 3) | 13.2 |
| 30 | 20 wt % (Primer 4) | 13.4 |

It is evident from Table 7 that the best adhesion occurred when the primer comprised 20 wt % epoxy and the film thickness was about 30 μm. The lap-shear strength was 13.2 MPa. Since the rupture was located at the thermoset composite surface, it is believed that the bond strength can be improved if the properties of the thermoset composite are improved. It is also evident from Table 7 that there is no significant difference in the lapshear bond strength of the joints prepared from Primer 3 and Primer 4.

Assembly of Twintex™ with Metal:

Normally, the hydrophobic nature of a thermoplastic polymer substrate prevents good adhesion of the substrate to the hydrophilic surface of a metal. In this Example, the lap-shear bond strengths of Twintex™ bonded to a stainless steel using Primer 1 and different commercial thermoset adhesives were evaluated. To assemble articles, a thin film (30 μm) of Primer 1 was fused to a Twintex™ substrate at a temperature above the melting point of the primer (180-200° C.) using a heat gun. A thin layer of adhesive was then applied to the primer by hand at room temperature and the metal was then applied to the adhesive. The adhesive was then allowed to harden. The adhesives used were Epoxy 5 (an epoxy resin from Lepage), Epoxy 30 (an epoxy resin called Epoxi-Patch™ from Dexter Corporation), PU (a polyurethane, self-prepared) and CyaAcry (a cyanoacrylate resin called Krazy Glue™ from Elmer Products). Table 8 compares the lap-shear bond strengths of the assembled Twintex™-metal articles.

TABLE 8

| Thermoset Adhesive | Lap-shear Bond Strength (MPa) |
|---|---|
| Epoxy 5 | 15.9 |
| Epoxy 30 | 17.2 |
| PU | 10.2 |
| CyaAcry | 4.4 |

The lap-shear bond strength of a metal-metal assembly joined using Epoxy 30 was 17 MPa. It is evident that the primer of the present invention permits excellent bonding of a polypropylene composite to a metal.

Coating of Twintex™

Primer 1 was molded onto the surface of a Twintex™ substrate by compression molding. One part of the primed surface was then painted with an epoxy-based paint and another part of the primed surface painted with an alkyd-based paint using a paint brush. For comparison, an unprimed Twintex™ substrate was coated in part with the epoxy-based paint and another part of the unprimed Twintex™ substrate was painted with the alkyd-based paint. Both the epoxy-based paint and the alkyd-based paint on the primed surface were impossible to remove, but the two paints on the unprimed surface were easily removed by hand.

Assembly of Polyethylene Terephthalate and Polyamide-6 with Metal:

In this Example, the lap-shear bond strengths of polyethylene terephthalate and polyamide-6 bonded to a stainless steel, alone and using Primer 6 and Primer 7, were evaluated. Table 9 provides the lap-shear bond strengths of the assembled articles.

TABLE 9

| Polymer | Lap-shear Bond Strength (MPa) |
|---|---|
| PET alone | 4.2 |
| PET with Primer 6 | 18.6 |
| PA-6 alone | 2.6 |
| PA-6 with Primer 7 | 18.6 |

It is evident from Table 9 that the use of the primer significantly increases the strength of the bond between the polymer and the metal.

Other advantages which are inherent to the invention will be evident to one skilled in the art.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A method of repairing, inserting, assembling or coating an article, the method comprising:
   placing a thermoplastic or elastomeric substrate in a mold;
   placing a primer in the mold, the primer comprising a film of an epoxy-modified polymer comprising an epoxy compound grafted to a polyolefin homopolymer or a polyolefin copolymer consisting of two or more olefin monomers, the epoxy compound being grafted through a coupling agent, the coupling agent comprising an unsaturated carboxylic acid or anhydride, the epoxy compound selected from the group consisting of one or more of diglycidyl ether of bis-phenol A, diglycidyl ether of p-aminophenol, N,N,N',N'-tetraglycidyl-4,4'-methylene-bis-benzene amine, 4-glycidyloxy-N,N'-diglycidylaniline, tetraglycidyl diamino diphenyl methane, diglycidyl ether of bis-phenol A novolac resin, epoxy phenol novolacs, epoxy cresol novolacs, polynuclear phenolepoxy and hydantoin epoxy;

placing a repair, insertion, assembly or coating material in the mold; and, heating to form a molded article.

2. The method according to claim 1, wherein the epoxy compound is grafted to polypropylene homopolymer.

3. The method according to claim 1, wherein the epoxy compound is grafted to polyethylene homopolymer.

4. The method according to claim 1, wherein the epoxy compound is grafted to a copolymer of polyethylene and polypropylene.

5. The method according to claim 1, wherein the repair, insertion, assembly or coating material comprises a metal.

6. The method according to claim 1, wherein the repair, insertion, assembly or coating material comprises wood or ceramic.

7. The method according to claim 1, wherein the repair, insertion, assembly or coating material comprises a thermoset, thermoplastic or elastomeric matrix.

8. The method according to claim 1, wherein the repair, insertion, assembly or coating material is a coating material comprising an organic coating, a gelcoat, an electrostatic coating, a paint, a varnish, a powder coating or a mixture thereof.

9. The method according to claim 1 further comprising placing an adhesive in the mold before heating.

10. The method according to claim 1, wherein the thermoplastic or elastomeric substrate comprises a polyolefin homopolymer or a polyolefin copolymer.

* * * * *